(12) United States Patent
Wetzel

(10) Patent No.: US 10,696,167 B2
(45) Date of Patent: Jun. 30, 2020

(54) ADJUSTABLE CHARGING ROBOT

(71) Applicant: Dr. Ing. h.c. F. Porsche Aktiengesellschaft, Stuttgart (DE)

(72) Inventor: Timo Wetzel, Eppingen (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 0 days.

(21) Appl. No.: 15/827,500

(22) Filed: Nov. 30, 2017

(65) Prior Publication Data

US 2018/0154785 A1 Jun. 7, 2018

(30) Foreign Application Priority Data

Dec. 1, 2016 (DE) .................... 10 2016 123 188

(51) Int. Cl.
*H02J 7/00* (2006.01)
*B60L 11/18* (2006.01)
(Continued)

(52) U.S. Cl.
CPC ........... *B60L 11/1812* (2013.01); *B60L 53/16* (2019.02); *B60L 53/22* (2019.02); *B60L 53/305* (2019.02);
(Continued)

(58) Field of Classification Search
CPC .............. B60L 11/1812; B60L 11/1818; B60L 11/1833; B60L 11/1846; B60L 11/1861
(Continued)

(56) References Cited

U.S. PATENT DOCUMENTS 9,056,555 B1    6/2015 Zhou
2010/0237985 A1*   9/2010 Landau-Holdsworth ....................
                                                                  B60L 3/0069
                                                                  340/5.8
(Continued)

FOREIGN PATENT DOCUMENTS

DE    102009006982 A1    8/2009
DE    102012216980 A1    4/2013
(Continued)

OTHER PUBLICATIONS

German Search Report for German Application No. 10 2016 123 188.6, dated Nov. 3, 2017, with partial English translation—8 Pages.
(Continued)

*Primary Examiner* — Zixuan Zhou
(74) *Attorney, Agent, or Firm* — RatnerPrestia

(57) ABSTRACT

A charging robot connects a contact-making device of an electric charging apparatus to an electric charging interface of a vehicle. The charging robot has a robot arm, which can be connected to the contact-making device. The robot arm is movable in at least three degrees of freedom in order to connect the contact-making device to the charging interface. The charging robot has a detection device for detecting an alignment of the vehicle charging interface. The robot arm has an adjuster for adjusting the contact-making device on the robot. Also described is a charging system for charging an electric energy store of a vehicle, and a method for adjusting the charging robot. The method includes detecting an alignment of the charging interface on the vehicle, and adjusting the contact-making device on the charging robot on the basis of the detected alignment of the charging interface.

9 Claims, 1 Drawing Sheet

(51) Int. Cl.
*B60L 58/12* (2019.01)
*B60L 53/16* (2019.01)
*B60L 53/22* (2019.01)
*B60L 53/30* (2019.01)
*B60L 53/36* (2019.01)
*B60L 53/65* (2019.01)
*H01R 13/631* (2006.01)
*H01R 43/26* (2006.01)

(52) U.S. Cl.
CPC ............... B60L 53/36 (2019.02); B60L 53/65 (2019.02); B60L 58/12 (2019.02); *H01R 13/631* (2013.01); *H01R 43/26* (2013.01); *H01R 2201/26* (2013.01); *Y02T 10/7005* (2013.01); *Y02T 10/705* (2013.01); *Y02T 10/7044* (2013.01); *Y02T 10/7088* (2013.01); *Y02T 90/121* (2013.01); *Y02T 90/125* (2013.01); *Y02T 90/127* (2013.01); *Y02T 90/128* (2013.01); *Y02T 90/14* (2013.01); *Y02T 90/163* (2013.01); *Y02T 90/169* (2013.01); *Y04S 30/14* (2013.01)

(58) Field of Classification Search
USPC ............................................. 320/109; 701/22
See application file for complete search history.

(56) References Cited

U.S. PATENT DOCUMENTS

2015/0210174 A1  7/2015  Settele
2016/0101701 A1* 4/2016  Wu .................. B60L 11/182
                                                          320/108
2017/0006411 A1  1/2017  Wu
2017/0008411 A1* 1/2017  Wu .................. B60L 11/1818
2017/0225582 A1  8/2017  Augst et al.

FOREIGN PATENT DOCUMENTS

| | | |
|---|---|---|
| DE | 102012014936 A1 | 1/2014 |
| DE | 102014107153 A1 | 12/2014 |
| JP | 0614408 A | 1/1994 |
| JP | 08265992 A | 10/1996 |
| JP | 2000092622 A | 3/2000 |
| JP | 2002255291 A | 9/2002 |
| JP | 2011117155 A | 6/2011 |
| JP | 2015186310 A | 10/2015 |
| WO | 2015112355 A1 | 7/2015 |
| WO | 2016096194 A1 | 6/2016 |

OTHER PUBLICATIONS

Japanese Notification of Reason of Rejection for Japanese Application No. 2017-228632, dated Oct. 19, 2018—5 pages.
English Translation of the Notification of Reason for Rejection for Japanese Application No. 2017-228632, dated Jun. 18, 2019, 6 pages.

* cited by examiner

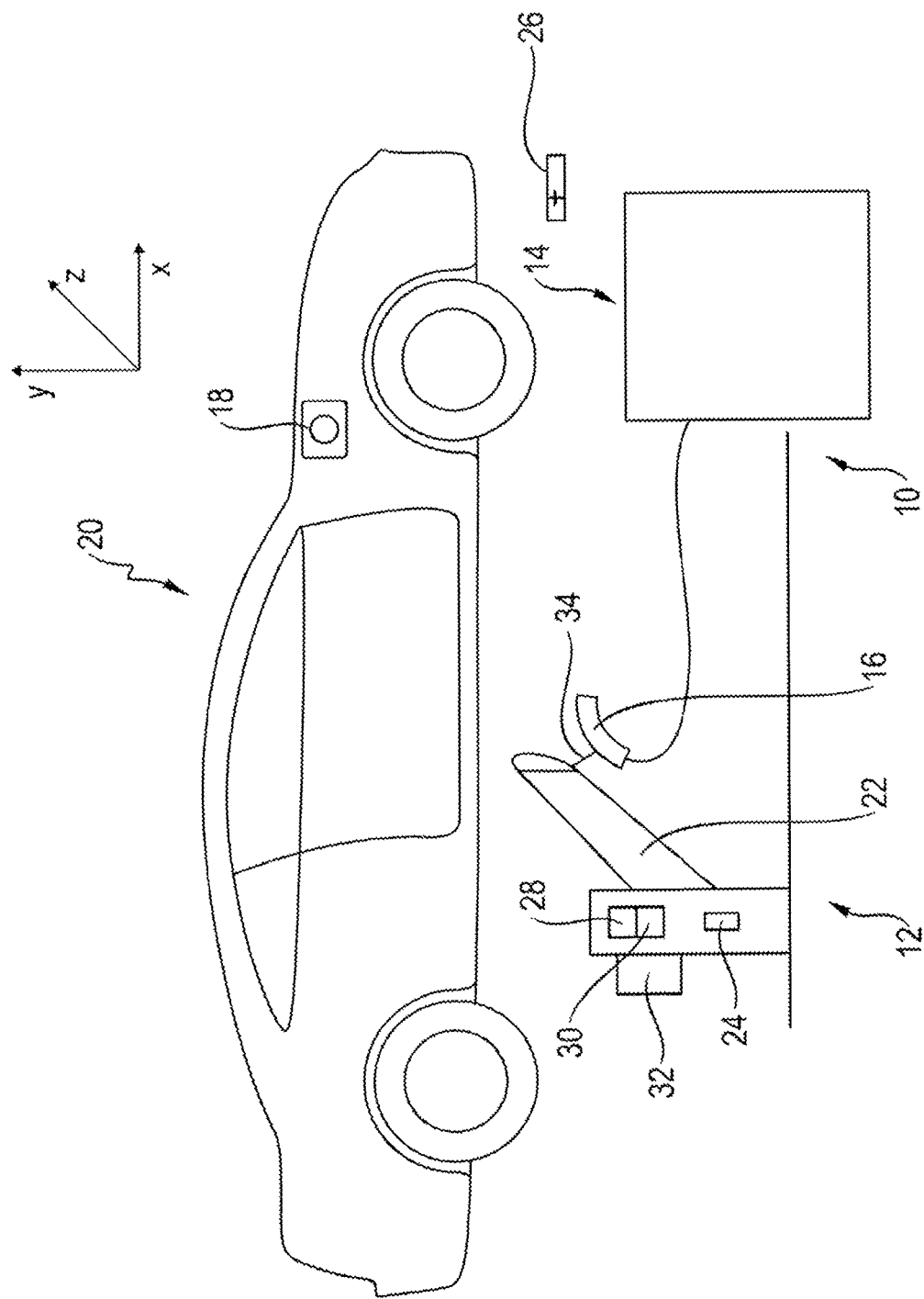

ADJUSTABLE CHARGING ROBOT

CROSS-REFERENCE TO RELATED APPLICATIONS

This application claims priority to German Patent Application No. DE 10 2016 123 188.6, filed Dec. 1, 2016, which is incorporated by reference herein in its entirety.

FIELD OF THE INVENTION

The present invention relates to a charging robot for connecting a contact-making device of an electric charging apparatus to an electric charging interface of a vehicle, the charging robot having a robot arm which can be connected to the contact-making device, and the robot arm being movable in at least three degrees of freedom in order to connect the contact-making device to the charging interface.

The present invention also relates to a charging system for charging an electric energy store of a vehicle, comprising a charging apparatus having a contact-making device, which can be connected to an electric charging interface of the vehicle, and a charging robot specified above.

Furthermore, the invention relates to a method for adjusting a charging robot for connecting the contact-making device of an electric charging apparatus to an electric charging interface of a vehicle, the charging robot having a robot arm which can be connected to the contact-making device, and the robot arm being movable in at least three degrees of freedom in order to connect the contact-making device to the charging interface.

BACKGROUND OF THE INVENTION

Charging robots of this type are used, for example, to automate the connection of an electric vehicle to a charging apparatus. As a result, this work can be carried out without a user, as a rule the driver of the vehicle. This leads to time savings for the driver. In addition, erroneous operation by the user is prevented.

Accordingly, in vehicles having a charging socket, here generally also designated as a charging interface, the charging plug, here generally also designated as a contact-making device, can be connected to the charging socket in an automated manner via a charging robot. For this purpose, it is usually necessary for the charging plug to be plugged into the charging socket in a small tolerance range, in order not to tilt and to keep the plug-in forces as low as possible, the plug-in forces usually being increased in the event of inclined plugging.

In practice, problems arise from the fact that, beside the position, the alignment of the charging sockets can be different, depending on the vehicle. The latter relates in particular to an inclination of the charging interface from a horizontal plane and/or at an angle to one side of the vehicle. Accordingly, it is necessary that the charging robot knows the position and alignment of the charging sockets. In order to be able to fabricate a charging robot beneficially, it is helpful if it has to move the charging plug in as few degrees of freedom as possible. Here, the rotation and inclination of the charging socket primarily have to be taken into account. In particular in the domestic sector, high costs for a charging robot are not acceptable.

One degree of freedom can be a movement in one axis direction x, y or z. Alternatively, an angular movement can also constitute one degree of freedom.

In this connection, a charging system for hybrid and electric vehicles is known, for example from DE 10 2009 006 982 A1, which is incorporated by reference herein. The charging system comprises a charging apparatus and a robot unit, wherein the robot unit is designed for the automatic connection of the charging apparatus to an interface of the energy source.

In addition, DE 10 2012 216 980 A1, which is incorporated by reference herein, discloses a vehicle charging station operated by a robot. The robot charging station comprises a base plate, a standpipe which is coupled to the base plate and extends substantially transversely with respect to the base plate, and a robot arm. The robot arm extends out from the standpipe and carries a gripping member. The gripping member contains a plurality of electric contacts, which are configured for coupling to a plug-in socket which is arranged on the electric vehicle. The robot arm is configured to move the gripping member with three movement stages.

Furthermore, DE 10 2014 226 357 A1, which is incorporated by reference herein, discloses an apparatus and a method for the automatic charging of an electric energy store in a vehicle. For this purpose, the position of a charging socket on a vehicle is firstly determined on the basis of vehicle-specific data. A charging robot then travels on the ground into the vicinity of the charging socket. The charging robot then produces a galvanic connection between charging station and charging socket. For this purpose, the charging robot introduces a contact head connected to the charging station into the charging socket of the vehicle. After the charging operation has been completed, the contact head is withdrawn from the charging socket and thus the vehicle is released.

Starting from the aforementioned prior art, the invention is thus based on the object of specifying a charging robot, a charging system and a method of the aforementioned type which permit simple, automatic connection of charging interface of a vehicle and contact-making device of a charging apparatus by means of a charging robot. In particular, an object of the present invention is to be able to carry out automatic charging of a vehicle in the domestic sector efficiently and economically.

According to aspects of the invention, the object is achieved by the features of the independent claims. Advantageous refinements of the invention are specified in the sub-claims.

According to aspects of the invention, a charging robot for connecting a contact-making device of an electric charging apparatus to an electric charging interface of a vehicle is thus provided, wherein the charging robot has a robot arm which can be connected to the contact-making device, the robot arm is movable in at least three degrees of freedom in order to connect the contact-making device to the charging interface, the charging robot has a device for detecting an alignment of the charging interface on the vehicle, and the robot arm has adjusting means for adjusting the contact-making device on the charging robot.

According to aspects of the invention, a charging system for a charging an electric energy store of a vehicle is also specified, comprising a charging apparatus having a contact-making device which can be connected to an electric charging interface of the vehicle, and a charging robot specified above.

According to aspects of the invention, a method for adjusting a charging robot for connecting the contact-making device of an electric charging apparatus to an electric charging interface of a vehicle is furthermore specified, wherein the charging robot has a robot arm which can be connected to the contact-making device, and the robot arm is movable in at least three degrees of freedom in order to connect the contact-making device to the charging interface, comprising the steps of detecting an alignment of the charging interface on the vehicle and adjusting the contact-making device on the charging robot on the basis of the detected alignment of the charging interface.

The basic idea of the present invention is, therefore, to provide a universal charging robot for use in different vehicles, wherein the alignment of the charging interface for a respective vehicle can be learned. This is carried out before the first charging of the vehicle with the charging robot. Thus, by means of adjusting the contact-making device, the charging robot can overall be adapted such that, by means of a movement with a few degrees of freedom, it can connect a charging interface formed in substantially any desired way on the vehicle to the contact-making device.

The adjustment is used in particular to adapt the contact-making device to the alignment of the charging interface on the vehicle. The alignment relates in particular to an angular position, i.e. an inclination of the charging interface, and a rotation of the charging interface. Corresponding deviations from a simple alignment of the charging interface, for example a simple alignment on the basis of coordinate axes aligned with a ground surface, frequently require complex movements of the robot arm with additional degrees of freedom. Conventional industrial robots frequently have five or more degrees of freedom. However, each additional degree of freedom increases the costs for the charging robot disproportionately, so that a simple charging robot is preferred. This applies in particular to applications in the domestic sector, in which the costs cannot be amortized via frequent use for different vehicles.

By means of a simultaneous movement of the robot arm in a plurality of degrees of freedom, the contact-making device can be connected to the charging interface in principle at any desired inclinations of the charging interface.

In principle, a charging robot having a robot arm which is movable only in one or two degrees of freedom can also be adequate for connecting the contact-making device to the charging interface. However, this does not have to be generally valid but sometimes can be adequate only in specific cases for connecting the contact-making device to the charging interface.

The robot arm can be implemented in one piece with the contact-making device. The robot arm can in principle also be part of the charging apparatus or vice versa. The contact-making device is, for example, a charging plug known per se. Here, contact-making device and charging interface can be implemented as desired as a corresponding pair comprising plug and socket, irrespective of the use of the term charging plug.

Following the learning operation described, the charging plug can be adjusted mechanically and fixed on the robot in the basic inclination and rotation. The robot arm then only has to be moved appropriately in its three degrees of freedom. The adjustment parameters are indicated by the robot, or output on a display or similar indicating route.

In an advantageous refinement of the invention, the detection device for detecting an alignment of the charging interface on the vehicle is an optical detection device. The optical detection device is preferably an optical camera or comprises a plurality of cameras. For example, two cameras can provide three-dimensional information, which can facilitate the detection of the alignment of the charging interface.

In an advantageous refinement of the invention, the adjusting means for adjusting the contact-making device on the charging robot can be actuated automatically by the charging robot on the basis of the detected alignment of the charging interface. Accordingly, following the detection of the alignment, the adjustment can be performed automatically. For this purpose, the adjusting means are preferably electrically adjustable, for example by actuating motors. Since the driving of the charging robot for connecting the contact-making device to the charging interface can be restricted to three degrees of freedom, the charging robot can be driven simply.

In an advantageous refinement of the invention, the charging robot has a user interface for outputting the alignment of the charging interface detected by the detection device. The user interface can be a basically arbitrary interface, in particular a display apparatus. The user interface can also be formed as an acoustic user interface or else as an electronic user interface for the electronic transmission of the alignment of the charging interface. The output comprises the alignment of the charging interface on the vehicle.

In an advantageous refinement of the invention, the adjusting means for adjusting the contact-making device on the charging robot are designed for manual adjustment by the charging robot on the basis of the alignment of the charging interface output by the user interface. This permits a particularly simple charging robot to be provided, which has a few degrees of freedom for a movement. In particular for use of the charging robot in the domestic sector, where typically only the private vehicle is charged via the charging apparatus, an economical charging robot can thus be provided. By means of a single adjustment of the contact-making device, a reliable connection of the charging apparatus to the vehicle can be carried out in a simple way.

In an advantageous refinement of the invention, the charging robot has a vehicle detection device and an assignment unit, wherein the assignment unit is designed to carry out an assignment of a detected alignment of the charging interface to the detected vehicle. Therefore, for each vehicle, it is possible to store a dataset having the alignment of the charging interface, to which access can be made when detecting a vehicle. Thus a multiplicity of different vehicles can be connected equally effectively by their charging interface to the charging apparatus without detection of the alignment of the charging interface being required each time. An alignment of the charging interface, "learned" once, can thus be retrieved simply.

In an advantageous refinement of the invention, the charging robot has an adapter plug for mechanical connection to the charging interface, or the adapter plug is assigned to the charging robot, and the detection device is designed to detect an alignment of the charging interface on the vehicle via a detection of an alignment of the adapter plug when connected to the charging interface. The adapter plug preferably projects out of the charging interface, so that the alignment of the charging interface can be detected not only as it is arranged on the outside of the vehicle but also in a region projecting beyond the same. As a result, the alignment of the charging interface can be detected particularly simply.

In an advantageous refinement of the invention, the adapter plug is designed with a reference mark for detection by the detection device. The reference mark can be any desired mark, for example an optical mark, which is formed on the adapter plug. Preferably, the adapter plug is designed on its surface with a target with reference points which can be detected or read by the charging robot. The reference mark is preferably implemented in such a way that it permits simple detection by the detection device. The reference mark is preferably an optical reference mark.

In an advantageous refinement of the invention, the step of detecting an alignment of the charging interface on the vehicle comprises the movement of the vehicle relative to the charging robot. As a result of the movement, a large area of the vehicle can be detected in a simple way in order to identify the charging interface on the vehicle and to detect the alignment of said interface on the vehicle. For this purpose, either the vehicle can be moved past the charging robot or the charging robot is fitted so as to be movable along the vehicle, for example on a guide rail.

In an advantageous refinement of the invention, the method has the additional step of the mechanical connection of an adapter plug to the charging interface, and the step of detecting an alignment of the charging interface on the vehicle comprises the detection of an alignment of the adapter plug when connected to the charging interface.

BRIEF DESCRIPTION OF THE DRAWINGS

The invention will be explained in more detail below with reference to the appended drawing and by using a preferred embodiment.

In the drawing:

The sole FIGURE shows a schematic illustration of a charging system comprising a charging robot and a charging apparatus for charging a vehicle according to a first, preferred embodiment.

DETAILED DESCRIPTION OF THE INVENTION

The sole FIGURE shows a charging system 10 according to aspects of the invention comprising a charging robot 12 and a charging apparatus 14 according to a first, preferred embodiment.

The charging apparatus 14 comprises a contact-making device 16, i.e. a charging plug, to be connected to an electric charging interface 18 of a vehicle 20. The contact-making device 16 and the charging interface 18 are implemented as a corresponding pair comprising plug and socket.

The charging robot 12 comprises a robot arm 22, which is connected to the contact-making device 16. The robot arm 22 is movable in three degrees of freedom to connect the contact-making device 16 to the charging interface 18, as indicated in the FIGURE by the coordinate axes x, y, z. In this exemplary embodiment, the robot arm 22 is movable linearly in the three coordinate axes x, y, z.

In an alternative exemplary embodiment, the robot arm 22 is embodied in one piece with the contact-making device 16.

The charging robot 12 comprises a detection device 24 for detecting an alignment of the charging interface 18 on the vehicle 20. The detection device 24 is implemented as an optical detection device 24, in particular comprising one or two cameras, the latter permitting the provision of three-dimensional information. The alignment here relates to an angular position, i.e. an inclination of the charging interface 18, and a rotation of the charging interface 18.

In order to detect the alignment of the charging interface 18 on the vehicle 20 reliably, the charging robot 12 comprises an adapter plug 26 for mechanical connection to the charging interface 18. The detection device 24 detects the alignment of the charging interface 18 on the vehicle 20 via the alignment of the adapter plug 26. The adapter plug 26 projects out of the charging interface 18. In this area, the adapter plug 26 has an optical reference mark which can be detected by the detection device 24. The reference mark in the present case is formed as an optical mark in the form of a target having reference points on a surface on the adapter plug 26.

In order to detect the alignment of the charging interface 18 on the vehicle 20, the vehicle 20 is moved relative to the charging robot 12. In this exemplary embodiment, the charging robot 12 is placed in a learning mode, and the vehicle 20 is moved past the charging robot 12.

In the process, at the same time the vehicle 20 is detected, for example via its license number, by a vehicle detection device 28 of the charging robot 12. The charging robot 12 also comprises an assignment unit 30, in which the alignment of the charging interface 18 is assigned to the detected vehicle 20 and jointly stored.

Following the detection of the alignment of the charging interface 18, in this exemplary embodiment the alignment of the charging interface 18 is displayed via a user interface 32 of the charging robot 12, which is implemented as a display. For this purpose, adjustment parameters are displayed on the display 32.

On the basis of the adjustment parameters, the contact-making device 16 on the robot arm 22 of the charging robot 12 can be adjusted in order to permit simple connection to the charging interface 18. For the purpose of adjustment, the contact-making device 16 is held on the robot arm 22 by adjusting means 34. The adjusting means 34 are designed for manual adjustment. The adjusting means 34 relate to means for adjusting the inclination and the rotation of the contact-making device 16.

In an alternative embodiment, the adjusting means 34 for adjusting the contact-making device 16 on the charging robot 12 are implemented with adjusting motors, which can be adjusted electrically by the charging robot 12 on the basis of the detected alignment of the charging interface 18.

Following the adjustment of the contact-making device 18, the charging apparatus 14 can be connected reliably to the charging interface 18 of the vehicle 20. For this purpose, the robot arm 22 is moved in its three degrees of freedom, wherein, by means of the simultaneous movement in two or more degrees of freedom, the contact-making device 16 can be inserted into the charging interface 18 in basically any desired manner.

What is claimed is:

1. A charging robot for connecting a contact-making device of an electric charging apparatus to an electric charging interface of a vehicle, the charging robot having a robot arm, which is configured to be connected to the contact-making device, and the robot arm being movable in at least three degrees of freedom in order to connect the contact-making device to the charging interface, wherein the charging robot has a detection device for detecting an alignment of the charging interface on the vehicle, and the robot arm has adjusting means extending between the robot arm and the contact-making device for adjusting an inclination and a rotational position of the contact-making device on the charging robot, wherein movement the robot arm is automated and controlled by the charging robot, wherein the charging robot has a user interface in the form of a display for outputting the alignment of the charging interface detected by the detection device to a user, and wherein the adjusting means are manually operable for connection to the charging interface.

2. The charging robot as claimed in claim 1, wherein the detection device for detecting an alignment of the charging interface on the vehicle is an optical detection device.

3. The charging robot as claimed in claim 1, wherein the charging robot has a vehicle detection device and an assignment unit, wherein the assignment unit is configured to carry out an assignment of a detected alignment of the charging interface to the detected vehicle.

4. The charging robot as claimed in claim 1, wherein the adapter plug is configured with a reference mark for detection by the detection device.

5. The charging robot as claimed in claim 1, wherein the charging robot has an adapter plug, which is separate from the contact-making device and the electric charging interface, for mechanical connection to the charging interface, and the detection device is configured to detect an alignment of the charging interface on the vehicle via a detection of an alignment of the adapter plug when connected to the charging interface.

6. A charging system for charging an electric energy store of a vehicle, comprising the charging apparatus with contact-making device, which is configured to be connected to the electric charging interface of the vehicle, and the charging robot as claimed in claim 1.

7. A charging robot for connecting a contact-making device of an electric charging apparatus to an electric charging interface of a vehicle, the charging robot having a robot arm, which is configured to be connected to the contact-making device, and the robot arm being movable in at least three degrees of freedom in order to connect the contact-making device to the charging interface, wherein the charging robot has a detection device for detecting an alignment of the charging interface on the vehicle, and the robot arm has adjusting means for adjusting the contact-making device on the charging robot, wherein the charging robot has a user interface in the form of a display for outputting the alignment of the charging interface detected by the detection device to a user, wherein the adjusting means for adjusting the contact-making device on the charging robot are configured for manual adjustment on the basis of the alignment of the charging interface output by the user interface.

8. A method for adjusting a charging robot for connecting a contact-making device of an electric charging apparatus to an electric charging interface of a vehicle, wherein the charging robot has (i) a robot arm which is configured to be connected to the contact-making device, and the robot arm is movable in at least three degrees of freedom in order to connect the contact-making device to the charging interface, and (ii) adjusting means extending between the robot arm and the contact-making device for adjusting an inclination and a rotational position of the contact-making device on the charging robot, said method comprising the steps of:

detecting an alignment of the charging interface on the vehicle using a detection device;

adjusting the robot arm on the charging robot on the basis of the detected alignment of the charging interface;

outputting the alignment of the charging interface detected by the detection device to a user interface in the form of a display;

manually adjusting the adjusting means to align the contact-making device on the robot arm to the electric charging interface of the vehicle; and connecting the contact-making device on the robot arm to the electric charging interface of the vehicle.

9. The method as claimed in claim 8, wherein the step of detecting an alignment of the charging interface on the vehicle comprises detecting the movement of the vehicle relative to the charging robot.

\* \* \* \* \*